United States Patent
Sato

(10) Patent No.: US 10,889,709 B2
(45) Date of Patent: Jan. 12, 2021

(54) THERMOPLASTIC RESIN COMPOSITION, INNER LINER AND PNEUMATIC TIRE

(71) Applicant: The Yokohama Rubber Co., Ltd., Tokyo (JP)

(72) Inventor: Shun Sato, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 303 days.

(21) Appl. No.: 15/741,654

(22) PCT Filed: Jun. 29, 2016

(86) PCT No.: PCT/JP2016/069312
§ 371 (c)(1),
(2) Date: Jan. 3, 2018

(87) PCT Pub. No.: WO2017/006827
PCT Pub. Date: Jan. 12, 2017

(65) Prior Publication Data
US 2020/0087502 A1    Mar. 19, 2020

(30) Foreign Application Priority Data
Jul. 7, 2015  (JP) ................................. 2015-136242

(51) Int. Cl.
| C08L 29/04 | (2006.01) |
| C08L 77/00 | (2006.01) |
| C08K 5/103 | (2006.01) |
| C08K 5/00  | (2006.01) |
| C08K 5/11  | (2006.01) |
| C08L 25/16 | (2006.01) |
| B60C 5/14  | (2006.01) |

(52) U.S. Cl.
CPC ............ C08L 29/04 (2013.01); C08K 5/0025 (2013.01); C08K 5/11 (2013.01); C08L 25/16 (2013.01); C08L 77/00 (2013.01); B60C 5/14 (2013.01)

(58) Field of Classification Search
CPC .......... C08L 77/00; C08L 29/04; C08L 29/06; C08L 23/0861; C08L 23/283; C08L 17/00; C08L 25/2618; C08L 25/26; C08L 25/18; C08K 5/103
See application file for complete search history.

(56) References Cited

U.S. PATENT DOCUMENTS

| 2012/0214943 A1 | 8/2012 | Sato et al. |
| 2013/0025757 A1* | 1/2013 | Tomoi ..................... C08L 77/00 152/450 |
| 2013/0146194 A1* | 6/2013 | Kawaguchi ............. C08L 15/00 152/450 |
| 2013/0156982 A1 | 6/2013 | Kawaguchi et al. |
| 2015/0315358 A1* | 11/2015 | Yonemoto ................. B60C 1/00 524/313 |
| 2016/0101650 A1 | 4/2016 | Yonemoto et al. |

FOREIGN PATENT DOCUMENTS

| EP | 0 969 039 A1 | 1/2000 |
| EP | 2 594 399 A1 | 5/2013 |
| EP | 2 889 322 A1 | 7/2015 |
| JP | S63-039935 A | 2/1988 |
| JP | 2002-052904 A | 2/2002 |
| JP | 2007-161822 A | 6/2007 |
| RU | 2018 121 219 A | 12/2009 |
| WO | WO 2007/050076 A1 | 5/2007 |
| WO | WO 2012/026167 A1 | 3/2012 |
| WO | WO 2012/035828 A1 | 3/2012 |
| WO | WO 2012/042975 A1 | 4/2012 |
| WO | WO 2014/098155 A1 | 6/2014 |
| WO | WO-2014098155 A1 * | 6/2014 |
| WO | WO 2014/185545 A1 | 11/2014 |

* cited by examiner

*Primary Examiner* — Karuna P Reddy
(74) *Attorney, Agent, or Firm* — Polsinelli PC

(57) ABSTRACT

Provided is a thermoplastic resin composition which enables the production of an inner liner for pneumatic tires, said inner liner having excellent durability and being suppressed in deterioration of air permeation prevention properties due to repeated deformation. A thermoplastic resin composition which is composed of a continuous phase containing an ethylene/vinyl alcohol copolymer and a polyamide and a dispersed phase containing a halogenated isomonoolefin/para-alkyl styrene copolymer, and which is characterized in that an acyl glycerol that is composed of glycerol and a fatty acid having 8 or less carbon atoms is contained in an amount of 0.5-20 parts by mass per 100 parts by mass of the ethylene/vinyl alcohol copolymer.

13 Claims, No Drawings

THERMOPLASTIC RESIN COMPOSITION, INNER LINER AND PNEUMATIC TIRE

CROSS REFERENCE TO RELATED APPLICATIONS

This application is a National Phase filing under 35 U.S.C. § 371 of PCT/JP2016/069312 filed on Jun. 29, 2016; and this application claims priority to Application No. 2015-136242 filed in Japan on Jul. 7, 2015, under 35 U.S.C. § 119. The entire contents of each application are hereby incorporated by reference.

TECHNICAL FIELD

The present invention relates to a thermoplastic resin composition, an inner liner for a pneumatic tire comprising the thermoplastic resin composition, and a pneumatic tire including the inner liner. More specifically, the present invention relates to a thermoplastic resin composition comprising a continuous phase comprising an ethylene-vinyl alcohol copolymer and a polyamide and a dispersed phase comprising a halogenated isomonoolefin-para-alkylstyrene copolymer, an inner liner for a pneumatic tire comprising the thermoplastic resin composition, and a pneumatic tire including the inner liner.

BACKGROUND ART

An inner liner for a tire inner surface comprising a resin composition containing an ethylene-vinyl alcohol copolymer and a hydrophobic plasticizer is known (Japanese Unexamined Patent Publication No. 2002-52904). According to Japanese Unexamined Patent Publication No. 2002-52904, flexibility and durability of the inner liner are improved by blending a hydrophobic plasticizer. Japanese Unexamined Patent Publication No. 2002-52904 describes an ester of glycerol as an example of a hydrophobic plasticizer, and esters of glycerol which are mentioned as specific examples are esters of stearic acid and glycerol and esters of lauric acid and glycerol.

CITATIONS LIST

Patent Literature

PTL 1: Japanese Unexamined Patent Publication No. 2002-52904

SUMMARY OF INVENTION

Technical Problem

However, even when a thermoplastic resin composition comprising a continuous phase comprising an ethylene-vinyl alcohol copolymer and a polyamide and a dispersed phase comprising a halogenated isomonoolefin-para-alkylstyrene copolymer is blended with an ester of a polyhydric alcohol and a higher fatty acid having 12 or more carbon atoms, durability may not be improved when the thermoplastic resin is formed as an inner liner.

An object of the present invention is to provide a thermoplastic resin composition which can produce an inner liner excellent in durability and less deterioration in air permeation prevention due to repeated deformation when a thermoplastic resin composition comprising a continuous phase comprising an ethylene-vinyl alcohol copolymer and a polyamide and a dispersed phase comprising a halogenated isomonoolefin-para-alkylstyrene copolymer is used as a material of an inner liner for a tire.

Solution to Problem

The present inventor has found that it is possible to improve the durability of an inner liner produced from the thermoplastic resin composition and to suppress deterioration of air permeation prevention due to repeated deformation by blending acylglycerol derived from fatty acid having not more than 8 carbon atoms and glycerol to a thermoplastic resin composition comprising a continuous phase comprising an ethylene-vinyl alcohol copolymer and a polyamide and a dispersed phase comprising a halogenated isomonoolefin-para-alkylstyrene copolymer, thereby completing the present invention.

The present invention is a thermoplastic resin composition comprising a continuous phase comprising an ethylene-vinyl alcohol copolymer and a polyamide and a dispersed phase comprising a halogenated isomonoolefin-para-alkylstyrene copolymer, wherein the composition comprises from 0.5 to 20 parts by weight of acylglycerol derived from a fatty acid having not more than 8 carbon atoms and glycerol based on 100 parts by weight of an ethylene-vinyl alcohol copolymer.

The present invention includes the following aspects.

[1] A thermoplastic resin composition comprising a continuous phase comprising an ethylene-vinyl alcohol copolymer and a polyamide and a dispersed phase comprising a halogenated isomonoolefin-para-alkylstyrene copolymer, wherein the composition comprises from 0.5 to 20 parts by weight of acylglycerol derived from a fatty acid having not more than 8 carbon atoms and glycerol based on 100 parts by weight of an ethylene-vinyl alcohol copolymer.

[2] The thermoplastic resin composition according to [1], wherein the acylglycerol is triacylglycerol.

[3] The thermoplastic resin composition according to [1] or [2], wherein the weight ratio of the ethylene-vinyl alcohol copolymer to the polyamide is from 95:5 to 40:60.

[4] The thermoplastic resin composition according to any one of [1] to [3], wherein the halogenated isomonoolefin-para-alkylstyrene copolymer is from 10 to 150 parts by weight based on 100 parts by weight of the total amount of the ethylene-vinyl alcohol copolymer and the polyamide.

[5] The thermoplastic resin composition according to any one of [1] to [4], wherein the dispersed phase further comprises an elastomer having an acid anhydride group.

[6] The thermoplastic resin composition according to any one of [1] to [5], wherein the halogenated isomonoolefin-para-alkylstyrene copolymer is dynamically crosslinked with a crosslinking agent.

[7] An inner liner for a pneumatic tire comprising the thermoplastic resin composition according to any one of [1] to [6].

[8] A pneumatic tire comprising the inner liner according to [7].

Advantageous Effects of Invention

Using the thermoplastic resin composition according to the present invention, an inner liner excellent in durability and less deterioration in air permeation prevention due to repeated deformation can be produced.

DESCRIPTION OF EMBODIMENTS

The present invention is a thermoplastic resin composition comprising a continuous phase comprising an ethylene-vinyl alcohol copolymer and a polyamide and a dispersed phase comprising a halogenated isomonoolefin-para-alkylstyrene copolymer, wherein the composition comprises from 0.5 to 20 parts by weight of acylglycerol derived from a fatty acid having not more than 8 carbon atoms and glycerol based on 100 parts by weight of an ethylene-vinyl alcohol copolymer.

The acylglycerol used in the present invention is an ester of a fatty acid having 8 or less carbon atoms and glycerol.

Examples of the fatty acid having not more than 8 carbon atoms include formic acid, acetic acid, propionic acid, butyric acid, isobutyric acid, valeric acid, isovaleric acid, pivalic acid, hexanoic acid, heptanoic acid, and octanoic acid, and preferable fatty acids are fatty acids having 2 to 7 carbon atoms.

There are three types of acylglycerol, i.e., monoacylglycerol, diacylglycerol, and triacylglycerol. Among these, triacylglycerol is preferable.

Preferable acylglycerols include glycerol triacetate, glycerol trihexanoate, glycerol triheptanoate, and glycerol trioctanoate. The most preferable acyl glycerol is glycerol triacetate.

The blending amount of the acylglycerol is from 0.5 to 20 parts by weight, preferably from 0.8 to 15 parts by weight, and more preferably from 1.0 to 12 parts by weight, based on 100 parts by weight of ethylene-vinyl alcohol copolymer. When the blending amount of acylglycerol is too small, the effect of suppressing deterioration of air permeation prevention due to repeated deformation is poor. When the blending amount of acylglycerol is too large, the air permeation prevention before repeated deformation is deteriorated.

The thermoplastic resin composition of the present invention comprises a continuous phase and a dispersed phase. In other words, the thermoplastic resin composition of the present invention has a so-called sea-island structure. The continuous phase (also referred to as "matrix phase") comprises an ethylene-vinyl alcohol copolymer and a polyamide. The disperse phase comprises a halogenated isomonoolefin-para-alkylstyrene copolymer. The dispersed phase preferably further comprises an elastomer having an acid anhydride group.

An ethylene-vinyl alcohol copolymer (hereinafter, also referred to as "EVOH") used in the present invention is a copolymer composed of an ethylene unit (—CH$_2$CH$_2$—) and a vinyl alcohol unit (—CH$_2$—CH(OH)—), and may contain another constituent unit in addition to the ethylene unit and the vinyl alcohol unit within a range not impairing an effect of the present invention. The ethylene-vinyl alcohol copolymer used in the present invention is preferably an ethylene-vinyl alcohol copolymer having an ethylene unit content (i.e., an ethylene compositional ratio) of from 32 to 48% by mole, and more preferably from 38 to 48% by mole. When the ethylene compositional ratio of the ethylene-vinyl alcohol copolymer is too small, the flexibility of the ethylene-vinyl alcohol copolymer decreases and the durability decreases. On the contrary, when the ethylene compositional ratio is too large, the air permeation prevention deteriorates. The ethylene-vinyl alcohol copolymer is a saponified product of an ethylene-vinyl acetate copolymer, and the saponification degree thereof is preferably 90% or more, and more preferably 98% or more. When the degree of saponification of the ethylene-vinyl alcohol copolymer is too small, the air permeation prevention is deteriorated and the thermal stability is deteriorated. Ethylene-vinyl alcohol copolymers are commercially available, for example, under the trade name of EVAL® from KURARAY CO., LTD., or under the trade name of SOANOL® from The Nippon Synthetic Chemical Industry Co., Ltd. Examples of the ethylene-vinyl alcohol copolymer having an ethylene compositional ratio of from 32% by mole to 48% by mole and a saponification degree of 90% or more include EVAL® H171B (ethylene compositional ratio of 38% by mole, saponification degree of 99% or more) and E171B (ethylene composition ratio of 44% by mole, saponification degree of 99% or more) manufactured by KURARAY CO., LTD., and Soarnol® H4815B (ethylene compositional ratio of 48% by mole, saponification degree of 99% or more), A4412B (ethylene compositional ratio of 42% by mole, saponification degree of 99% or more), and DC3212B (ethylene compositional ratio of 32% by mole, saponification degree of 99% or more) manufactured by Nippon Synthetic Chemical Industry Co., Ltd.

The polyamide used in the present invention includes, but is not limited to, nylon 6, nylon 11, nylon 12, nylon 46, nylon 66, nylon 610, nylon 612, nylon 6/66, nylon 6/66/12, nylon MXD6, nylon 6T, and nylon 9T. Among these, nylon 6, nylon 6/66, and nylon 612 are preferable in view of compatibility between durability and air permeation prevention.

The weight ratio of the ethylene-vinyl alcohol copolymer and the polyamide is preferably from 95:5 to 40:60, more preferably from 90:10 to 45:55%, and still more preferably from 85:15 to 50:50. When the proportion of the ethylene-vinyl alcohol copolymer is too low, the air permeation prevention before repeated deformation is not sufficient, and when the proportion of the ethylene-vinyl alcohol copolymer is too high, the low temperature durability is deteriorated.

The halogenated isomonoolefin-para-alkylstyrene copolymer used in the present invention can be produced by halogenating a copolymer of isomonoolefin and para-alkylstyrene. The mixing ratio, polymerization rate, average molecular weight, polymerized form (block copolymer, random copolymer etc.), viscosity, halogen atom, and the like of halogenated isomonoolefin and para-alkylstyrene are not particularly limited, and can be arbitrarily selected according to physical properties or the like preferable for a thermoplastic elastomer composition. Examples of isomonoolefins constituting the halogenated isomonoolefin-para-alkylstyrene copolymer include isobutylene, isopentene, and isohexene, and isobutylene is preferable. Examples of the para-alkylstyrene constituting the halogenated isomonoolefin-para-alkylstyrene copolymer include para-methylstyrene, para-ethylstyrene, para-propylstyrene, and para-butylstyrene. Para-methylstyrene is preferable. Examples of the halogen constituting the halogenated isomonoolefin-para-alkylstyrene copolymer include fluorine, chlorine, bromine and iodine. Bromine is preferable. A particularly preferable halogenated isoolefin-para-alkylstyrene copolymer is a brominated isobutylene-para-methylstyrene copolymer.

A brominated isobutylene-para-methylstyrene copolymer is a brominated isobutylene-para-methylstyrene copolymer having a repeating unit represented by formula (1):

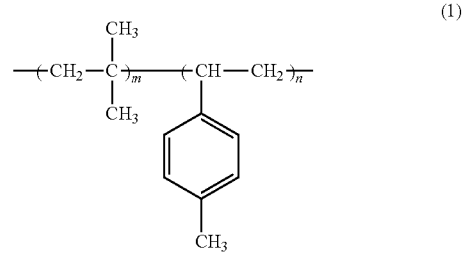

and is typically one having a repeating unit represented by formula (2).

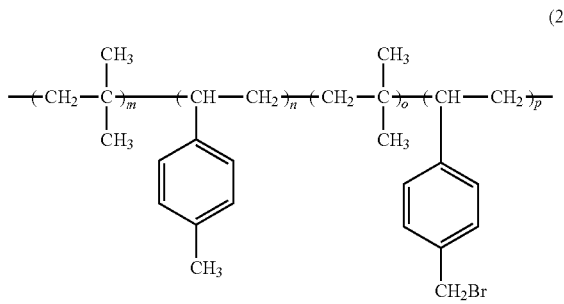

(2)

The brominated isobutylene-para-methylstyrene copolymer can be obtained from Exxon Mobil Chemical Company under the product name EXXPRO®.

The blending amount of the halogenated isomonoolefin-para-alkylstyrene copolymer is preferably from 10 to 150 parts by weight, more preferably from 20 to 140 parts by weight, and still more preferably from 30 to 130 parts by weight based on 100 parts by weight of the total amount of the ethylene-vinyl alcohol copolymer and the polyamide. When the amount of the halogenated isomonoolefin-para-alkylstyrene copolymer is too small, the low temperature durability is inferior. When the amount is too large, the fluidity at the time of melting is lowered and the film formability is deteriorated.

The halogenated isomonoolefin-para-alkylstyrene copolymer is preferably dynamically crosslinked with a crosslinking agent. By dynamic crosslinking, it is possible to fix the continuous phase and the dispersed phase of the thermoplastic resin composition. Dynamic crosslinking can be carried out by melt-kneading a halogenated isomonoolefin-para-alkylstyrene copolymer with a crosslinking agent.

Examples of crosslinking agents used for dynamic crosslinking include zinc oxide, stearic acid, zinc stearate, magnesium oxide, m-phenylene bismaleimide, alkylphenol resins and their halides, and secondary amines. Examples of the secondary amine used as a crosslinking agent include N-(1,3-dimethylbutyl)-N'-phenyl-p-phenylenediamine and polymerized 2,2,4-trimethyl-1,2-dihydroquinoline. Among them, zinc oxide, stearic acid, zinc stearate, N-(1,3-dimethylbutyl)-N'-phenyl-p-phenylenediamine can be preferably used as a crosslinking agent for dynamic crosslinking.

The amount of the crosslinking agent is preferably from 4 to 12 parts by weight, more preferably from 6 to 9 parts by weight, based on 100 parts by weight of the halogenated isomonoolefin-para-alkylstyrene copolymer. When the amount of the crosslinking agent is too small, the dynamic crosslinking becomes insufficient and the fine dispersion of the halogenated isomonoolefin-para-alkylstyrene copolymer may not be maintained, whereby the durability deteriorates. On the contrary, too large an amount of the crosslinking agent causes scorching during kneading and processing, and generation of a foreign matter in a film.

The dispersed phase preferably further comprises an elastomer having an acid anhydride group. By blending an elastomer having an acid anhydride group, low temperature durability and flexibility can be improved.

Examples of the acid anhydride-containing elastomer used in the present invention include maleic anhydride-modified ethylene-α-olefin copolymer elastomer, maleic anhydride-modified ethylene-(meth)acrylate copolymer elastomer, and maleic anhydride-modified ethylene-(meth)acrylate copolymer elastomer.

Examples of the maleic anhydride-modified ethylene-α-olefin copolymer elastomer include maleic anhydride-modified ethylene-propylene copolymer elastomer, maleic anhydride-modified ethylene-butene copolymer elastomer, maleic anhydride-modified ethylene-hexene copolymer elastomer, and maleic anhydride-modified ethylene-octene copolymer elastomer.

Examples of the maleic anhydride-modified ethylene-(meth)acrylate copolymer elastomer include maleic anhydride-modified ethylene-acrylate copolymer elastomer and maleic anhydride-modified ethylene-methacrylate copolymer elastomer.

Examples of the maleic anhydride-modified ethylene-(meth)acrylate copolymer elastomer include maleic anhydride-modified ethylene-methyl acrylate copolymer elastomer, maleic anhydride-modified ethylene-ethyl acrylate copolymer elastomer, maleic anhydride-modified ethylene-methyl methacrylate copolymer elastomer, and maleic anhydride-modified ethylene-ethyl methacrylate copolymer elastomer.

Among them, preferable elastomers having an acid anhydride are maleic anhydride-modified ethylene-butene copolymer, maleic anhydride-modified ethylene-propylene copolymer, and maleic anhydride-modified ethylene-octene copolymer. Maleic anhydride-modified ethylene-butene copolymers are commercially available, and can be obtained, for example, from Mitsui Chemicals, Inc., under the product names of TAFMER® MH7010 and MH7020, and maleic anhydride-modified ethylene-propylene copolymers can be obtained, for example, from Mitsui Chemicals, Inc. under the product names of TAFMER® MP0610 and MP0620.

When the thermoplastic resin composition comprises an elastomer having an acid anhydride, the blending amount of the acid anhydride-containing elastomer is preferably from 10 to 150 parts by weight based on 100 parts by weight of the total amount of the ethylene-vinyl alcohol copolymer and the polyamide, more preferably from 20 to 140 parts by weight, and still more preferably from 30 to 130 parts by weight. When the blending amount of the elastomer is too small, an effect of improving low temperature durability and flexibility may not be sufficiently obtained. When the blending amount of the elastomer is too large, the fluidity at the time of melting is lowered, and the film formability is deteriorated.

The thermoplastic resin composition of the present invention may contain a resin other than ethylene-vinyl alcohol copolymer and polyamide, an elastomer other than halogenated isomonoolefin-para-alkylstyrene copolymer and elastomer having acid anhydride, and various additives within a range not impairing an effect of the present invention. Examples of the additive include a crosslinking agent, an antioxidant, a plasticizer, a processing aid (such as metal soap), a crosslinking accelerating aid, a crosslinking accelerator, a strengthening agent (filler), a scorch inhibitor, a mastication accelerator, an organic modifier, a softener, and a tackifier.

The thermoplastic resin composition of the present invention is not limited, and may be produced by melt-kneading ethylene-vinyl alcohol copolymer, polyamide, halogenated isomonoolefin-para-alkylstyrene copolymer, acylglycerol, and as needed, an elastomer having an acid anhydride, and other components at a temperature not lower than the melting point of the polyamide. When a crosslinking agent is added, the crosslinking agent may be mixed with a halogenated isomonoolefin-para-alkylstyrene copolymer in advance, added before melt-kneading, or added during melt-kneading.

The melt-kneading temperature is a temperature equal to or higher than the melting point of a polyamide, and is preferably a temperature 20° C. higher than the melting point of the polyamide, for example 180 to 300° C. The melt-kneading time is usually from 1 to 10 minutes, and preferably from 1 to 5 minutes.

The thermoplastic resin composition of the present invention can be produced preferably by continuously kneading an ethylene-vinyl alcohol copolymer, a polyamide, and a halogenated isomonoolefin-para-alkylstyrene copolymer with a twin-screw kneader and dispersing the halogenated isomonoolefin-para-alkylstyrene copolymer in a continuous phase (matrix phase) composed of the ethylene-vinyl alcohol copolymer and the polyamide by the kneading and dynamic crosslinking.

More specifically, for example, a halogenated isomonoolefin-para-alkylstyrene copolymer, a crosslinking agent, and, as needed, other additives are mixed at from 60 to 150° C. to prepare a rubber compound, and the rubber compound and a polyamide and an ethylene-vinyl alcohol copolymer, and, as needed, other resins or additives are charged into a biaxial kneading machine with set temperature of from 220 to 250° C., and the halogenated isomonoolefin-para-alkylstyrene copolymer is dispersed and dynamically crosslinked to obtain a thermoplastic resin composition of the present invention.

The present invention is also an inner liner for a pneumatic tire comprising the thermoplastic resin composition.

The thermoplastic resin composition of the present invention can be made into a film with an extruder equipped with a T-die, an inflation molding machine, or the like. Since a film made of the thermoplastic resin composition of the present invention is excellent in air permeation prevention and durability, the film can be suitably used as an inner liner of a pneumatic tire.

The present invention is also a pneumatic tire including the inner liner.

More specifically, the pneumatic tire of the present invention is a pneumatic tire including a film of the thermoplastic resin composition as an inner liner. As a method of manufacturing the pneumatic tire, a conventional method can be used. For example, the thermoplastic resin composition of the present invention is extruded into a film having a predetermined width and thickness, and the film is attached in a cylindrical shape on a tire molding drum as an inner liner. Members used for manufacturing ordinary tires such as a carcass layer made of unvulcanized rubber, a belt layer, a tread layer, and the like are sequentially stuck thereon, and the members are pulled out from the drum to form a green tire. Next, by heating and vulcanizing this green tire according to a conventional method, it is possible to manufacture a desired pneumatic tire.

EXAMPLES

Hereinafter, the present invention will be described in more detail based on Examples, but is not limited to the following Examples.

[Raw Materials]

Raw materials used in the following Examples and Comparative Examples are as follows.

As the ethylene-vinyl alcohol copolymer (hereinafter, also referred to as "EVOH"), the following three types were used.

SOANOL® D2908 manufactured by Nippon Synthetic Chemical Industry Co., Ltd.

SOANOL® E3808 manufactured by Nippon Synthetic Chemical Industry Co., Ltd.

SOANOL® H4815B manufactured by Nippon Synthetic Chemical Industry Co., Ltd.

As the polyamide, the following two types were used.

Nylon 6: "UBE Nylon" 1013B manufactured by Ube Industries, Ltd.

Nylon 6/66: "UBE Nylon" 5023B manufactured by Ube Industries, Ltd.

The following halogenated isomonoolefin-para-alkylstyrene copolymer was used.

Brominated isobutylene-para-methyl styrene copolymerize rubber: EXXPRO® MDX89-4 manufactured by Exxon Mobil Chemical Company The following elastomer having an acid anhydride group was used.

Acid-modified elastomer: maleic anhydride-modified ethylene-butene copolymer TAFMER® MH7010 manufactured by Mitsui Chemicals, Inc.

The following 5 types were used as acyl glycerol.

Glycerol triacetate: manufactured by DAIHACHI CHEMICAL INDUSTRY CO., LTD.

Glycerol trioctanoate: PANACETE® 800 manufactured by NOF CORPORATION

Glycerol monostearate: "MONOGLY MD" manufactured by NOF CORPORATION

Glycerol trihexanoate manufactured by Energy Chemical Co., Ltd.

Glycerol triheptanoate manufactured by Energy Chemical Co., Ltd.

The following crosslinking agent was used.

Zinc oxide: zinc oxide No. 3 manufactured by SEIDO CHEMICAL INDUSTRY CO., LTD.

The following antioxidant was used.

6PPD: Santoflex 13 (N-(1,3-dimethylbutyl)-N'-phenyl-1, 4-phenylenediamine) manufactured by Flexsys Company

[Preparation of Thermoplastic Resin Composition]

An ethylene-vinyl alcohol copolymer, a polyamide, a brominated isobutylene-paramethylstyrene copolymer rubber (hereinafter, referred to as "Br-IPMS"), an acylglycerol, an acid-modified elastomer, and a crosslinking agent were charged into a cylinder of a twin-screw kneading extruder (manufactured by THE JAPAN STEEL WORKS, LTD.) in the formulation shown in Table 1, conveyed to a kneading zone set at a temperature of 230° C. and a residence time of about from 3 to 8 minutes, melt-kneaded, and the melt-kneaded product was extruded in a strand shape from a die attached to the discharge port. The obtained strand-shaped extrudate was pelletized with a resin pelletizer to obtain a pellet-like thermoplastic resin composition. For the obtained thermoplastic resin composition, the rate of change of air permeability coefficient and low temperature durability were evaluated. The evaluation results are listed on Table 1.

[Rate of Change of Air Permeability Coefficient]

The prepared pellet-shaped thermoplastic resin composition was molded into a film having an average thickness of 0.1 mm under extrusion conditions of extrusion temperatures of C1/C2/C3/C4/die=220/225/230/235/235° C., a cooling roll temperature of 50° C., and a take-up speed of 4 m/min using a 550 mm width T-die equipped 40 mmφ single screw extruder (manufactured by Pla Giken Co., Ltd.). The film was cut into a predetermined size and laminated with a sheet of the rubber composition listed on Table 2 and vulcanized and bonded at 180° C. for 10 minutes to obtain a laminate of a thermoplastic resin composition and a rubber composition. The laminate was cut into a width of 5 cm and subjected to repeated deformation of 1 million times using a constant strain tester (Ueshima Seisakusho Co., Ltd.). The air permeability coefficient of the laminate was measured at a temperature of 23° C. and a humidity of 0% RH before and after applying repeated deformation, and the rate of change in air permeability coefficient was calculated by the following equation.

rate of change of air permeability coefficient=air permeability coefficient after deformation/air permeability coefficient before deformation×100 (%)

A change rate of the air permeability coefficient of less than 200% was determined to be acceptable.

[Low Temperature Durability]

The prepared pellet-shaped thermoplastic resin composition was molded into a sheet having an average thickness of 1.0 mm under extrusion conditions of extrusion temperatures of C1/C2/C3/C4/die=220/225/230/235/235° C., a cooling roll temperature of 50° C., and a take-up speed of 1.0 m/min using a 200 mm width T-die equipped 40 mmϕ single screw extruder (Pla Giken Co., Ltd.), and a dumbbell (JIS No. 3) was punched out from the sheet. The dumbbell was set in a constant strain tester (Ueshima Seisakusho Co., Ltd.), repeatedly subjected to 40% constant strain in an atmosphere of −40° C., and the number of breaks was measured. Based on the number of breaks of Comparative Example 1, the number of breaks of not less than 0.5 times and less than 3.0 times the number of breaks of Comparative Example 1 was judged as "good", the number of breaks of not less than 0.2 times and less than 0.5 times the number of breaks of Comparative Example 1 was judged as "fair", the number of breaks less than 0.2 times the number of breaks of Comparative Example 1 was judged as "poor", and the number of breaks of not less than 3.0 times the number of breaks of Comparative Example 1 was judged as "excellent". When the judgment is "fair", "good", or "excellent", a tire to which a film made of the thermoplastic resin composition is applied can be run with no problem in durability.

TABLE 1

| | | | Comparative Example 1 | Comparative Example 2 | Comparative Example 3 | Comparative Example 4 | Example 1 | Example 2 | Example 3 |
|---|---|---|---|---|---|---|---|---|---|
| EVOH | SOANOL® E3808 | parts by weight | 70 | 60 | 100 | 70 | 70 | 70 | 70 |
| | SOANOL® H4815B | parts by weight | | | | | | | |
| Polyamide | UBE Nylon 1013B | parts by weight | 30 | 40 | | 30 | 30 | 30 | 30 |
| | UBE Nylon 5023B | parts by weight | | | | | | | |
| Br-1PMS | EXXPRO® MOX89-4 | parts by weight | 50 | 130 | | 70 | 40 | 50 | 100 |
| Acylglycerol | Glycerol triacetate | parts by weight | | | 3 | | 1 | 4 | 7 |
| | Glycerol trioctanoate | parts by weight | | | | | | | |
| | Glycerol monostearate | parts by weight | | | | 3.5 | | | |
| | Glycerol trihexanoate | parts by weight | | | | | | | |
| | Glycerol triheptanoate | parts by weight | | | | | | | |
| Acid-modified elastomer | TAFMER® MH7010 | parts by weight | | | | | | | |
| Crosslinking agent | zinc oxide | parts by weight | 1 | 2 | | 1 | 1 | 1 | 2 |
| Antioxidant | 6PPD | parts by weight | 1 | 2 | | 1 | 1 | 1 | 2 |
| Rate of change of air permeability coefficient | | % | 280 | 230 | 350 | 250 | 190 | 130 | 110 |
| Low temperature durability | | | good | excellent | poor | good | fair | fair | good |

| | | | Example 4 | Example 5 | Example 6 | Example 7 | Example 8 | Example 9 | Example 10 |
|---|---|---|---|---|---|---|---|---|---|
| EVOH | SOANOL® E3808 | parts by weight | 70 | 70 | | 60 | | 60 | |
| | SOANOL® H4815B | parts by weight | | | 50 | | 60 | | 50 |
| Polyamide | UBE Nylon 1013B | parts by weight | 30 | 30 | | 40 | | 40 | |
| | UBE Nylon 5023B | parts by weight | | | 50 | | 40 | | 50 |
| Br-1PMS | EXXPRO® MDX89-4 | parts by weight | 120 | 50 | 50 | 40 | 50 | 70 | 50 |
| Acylglycerol | Glycerol triacetate | parts by weight | 11 | | 2.5 | 3 | 3 | | |
| | Glycerol trioctanoate | parts by weight | | 3.5 | | | | | |
| | Glycerol monostearate | parts by weight | | | | | | | |

TABLE 1-continued

|  |  |  |  |  |  |  |  | 5 |  |
|---|---|---|---|---|---|---|---|---|---|
|  | Glycerol trihexanoate | parts by weight |  |  |  |  |  | 5 |  |
|  | Glycerol triheptanoate | parts by weight |  |  |  |  |  |  | 2.5 |
| Acid-modified elastomer | TAFMER® MH7010 | parts by weight |  |  |  | 40 | 50 | 50 | 70 |
| Crosslinking agent | zinc oxide | parts by weight | 2 | 1 | 2 | 1 | 1 | 2 | 1 |
| Antioxidant | 6PPD | parts by weight | 2 | 1 | 2 | 1 | 1 | 2 | 1 |
| Rate of change of air permeability coefficient |  | % | 100 | 130 | 110 | 140 | 140 | 110 | 130 |
| Low temperature durability |  |  | excellent | good | good | excellent | excellent | excellent | excellent |

TABLE 2

Formulation of Unvulcanized Rubber Composition

| Raw Materials | Amount (parts by weight) |
|---|---|
| Halogenated butyl rubber[1] | 100 |
| GPF carbon black[2] | 30 |
| Wet silica[3] | 20 |
| Aromatic oil[4] | 7.5 |
| Zinc oxide[5] | 3 |
| Stearic acid[6] | 1 |
| Sulfur[7] | 1 |
| Vulcanization accelerator[8] | 1.5 |
| Total | 164 |

Footnote:
[1]BROMOBUTYL X2 manufactured by LANXESS Rubber Corporation
[2]HTC#G manufactured by NSCC Carbon Co., Ltd.
[3]Zeosil® 165GR manufactured by Rhodia Corporation
[4]Extract 4S manufactured by SHOWA SHELL SEKIYU K.K.
[5]Zinc oxide No. 3 manufactured by SEIDO CHEMICAL INDUSTRY CO., LTD.
[6]Beads Stearic Acid YR manufactured by NOF CORPORATION
[7]"GOLDEN FLOWER" SULFUR POWDER 150 mesh manufactured by Tsurumi Chemical Industry Co., ltd.
[8]NOCCELER DM manufactured by OUCHI SHINKO CHEMICAL INDUSTRIAL CO., LTD.

INDUSTRIAL APPLICABILITY

The thermoplastic resin composition of the present invention can be suitably used for producing an inner liner for a pneumatic tire.

The invention claimed is:

1. A thermoplastic resin composition comprising a continuous phase comprising an ethylene-vinyl alcohol copolymer and a polyamide and a dispersed phase comprising a halogenated isomonoolefin-para-alkylstyrene copolymer, wherein the composition comprises from 0.5 to 20 parts by weight of an acylglycerol based on 100 parts by weight of the ethylene-vinyl alcohol copolymer, wherein said acylglycerol consists of triglyceride derived from a fatty acid having 2 to 7 carbon atom and glycerol.

2. The thermoplastic resin composition according to claim 1, wherein the weight ratio of the ethylene-vinyl alcohol copolymer to the polyamide is from 95:5 to 40:60.

3. The thermoplastic resin composition according to claim 1, wherein the halogenated isomonoolefin-para-alkylstyrene copolymer is from 10 to 150 parts by weight based on 100 parts by weight of the total amount of the ethylene-vinyl alcohol copolymer and the polyamide.

4. The thermoplastic resin composition according to claim 1, wherein the dispersed phase further comprises an elastomer having an acid anhydride group.

5. The thermoplastic resin composition according to claim 1, wherein the halogenated isomonoolefin-para-alkylstyrene copolymer is dynamically crosslinked with a crosslinking agent.

6. The thermoplastic resin composition according to claim 2, wherein the halogenated isomonoolefin-para-alkylstyrene copolymer is from 10 to 150 parts by weight based on 100 parts by weight of the total amount of the ethylene-vinyl alcohol copolymer and the polyamide.

7. The thermoplastic resin composition according to claim 2, wherein the dispersed phase further comprises an elastomer having an acid anhydride group.

8. The thermoplastic resin composition according to claim 3, wherein the dispersed phase further comprises an elastomer having an acid anhydride group.

9. The thermoplastic resin composition according to claim 2, wherein the halogenated isomonoolefin-para-alkylstyrene copolymer is dynamically crosslinked with a crosslinking agent.

10. The thermoplastic resin composition according to claim 3, wherein the halogenated isomonoolefin-para-alkylstyrene copolymer is dynamically crosslinked with a crosslinking agent.

11. The thermoplastic resin composition according to claim 4, wherein the halogenated isomonoolefin-para-alkylstyrene copolymer is dynamically crosslinked with a crosslinking agent.

12. An inner liner for a pneumatic tire comprising the thermoplastic resin composition according to claim 1.

13. A pneumatic tire comprising the inner liner according to claim 12.

* * * * *